United States Patent
Ganapathy et al.

(10) Patent No.: US 10,255,153 B2
(45) Date of Patent: Apr. 9, 2019

(54) SYSTEMATIC TESTING OF FAILOVER AND RECOVERY FOR DISTRIBUTED SYSTEM COMPONENTS

(71) Applicant: MICROSOFT TECHNOLOGY LICENSING, LLC, Redmond, WA (US)

(72) Inventors: Narayanan Ganapathy, Redmond, WA (US); Shaz Qadeer, Mercer Island, WA (US); Akash Lal, Bangalore (IN)

(*) Notice: Subject to any disclaimer, the term of this patent is extended or adjusted under 35 U.S.C. 154(b) by 199 days.

(21) Appl. No.: 15/331,670

(22) Filed: Oct. 21, 2016

(65) Prior Publication Data
US 2018/0113775 A1    Apr. 26, 2018

(51) Int. Cl.
G06F 11/00    (2006.01)
G06F 11/263    (2006.01)
G06F 11/22    (2006.01)

(52) U.S. Cl.
CPC ........ G06F 11/263 (2013.01); G06F 11/2242 (2013.01)

(58) Field of Classification Search
CPC ............. G06F 11/2205; G06F 11/2273; G06F 11/263; G06F 11/28
See application file for complete search history.

(56) References Cited

U.S. PATENT DOCUMENTS

| | | | |
|---|---|---|---|
| 6,161,193 A | 12/2000 | Garg et al. | |
| 7,243,267 B2 | 7/2007 | Klemm et al. | |
| 7,502,962 B2 | 3/2009 | Yach et al. | |
| 8,560,887 B2 | 10/2013 | Behrendt et al. | |
| 8,776,093 B2 | 7/2014 | Lupu et al. | |
| 8,880,931 B2 | 11/2014 | Sun | |
| 8,886,995 B1 | 11/2014 | Pallapothu et al. | |
| 9,213,609 B2 | 12/2015 | Hansen et al. | |
| 9,280,453 B1* | 3/2016 | Covarrubias | G06F 11/3684 |

(Continued)

OTHER PUBLICATIONS

Bruening, et al., "Systematic Testing of Multithreaded Programs", Published on: Jun. 18, 2010 Available at: http://publications.csail.mit.edu/lcs/pubs/pdf/MIT-LCS-TM-607.pdf.

(Continued)

*Primary Examiner* — Marc Duncan
(74) *Attorney, Agent, or Firm* — Shook, Hardy & Bacon, L.L.P.

(57) ABSTRACT

In various embodiments, methods and systems for testing failover and recovery are provided. Systematic testing of a distributed system is performed, where the systematic testing probabilistically determines a processing order of events to effectuate system states for the plurality of state machines. An iteration of the systematic testing tests one the system states and includes sending a termination message to a state machine; receiving a termination acknowledgment message, the termination message causing the state machine to halt at the state and event of the state machine for the system state; and instantiating a recovery state machine. The recovery state machine is instantiated with a same state and same role as the halted state machine. Results of the systematic testing are verified against an expected outcome, the results being generated by running the distributed system with the instantiated recovery state machine for each iteration of the systematic testing.

20 Claims, 6 Drawing Sheets

(56) References Cited

U.S. PATENT DOCUMENTS

| 9,645,811 B2* | 5/2017 | Carlen | H04L 65/80 |
|---|---|---|---|
| 2008/0126829 A1* | 5/2008 | Robertson | G06F 11/261 |
| | | | 714/2 |
| 2008/0215925 A1* | 9/2008 | Degenaro | G06F 11/263 |
| | | | 714/41 |
| 2011/0154092 A1 | 6/2011 | Dash et al. | |
| 2015/0309883 A1 | 10/2015 | North | |

OTHER PUBLICATIONS

B. Schneider, Fred, "The State Machine Approach: A Tutorial", In Proceedings of a Workshop on Fault Tolerant Distributed Computing Lecture Notes in Computer Science series, Apr. 20, 2015, pp. 18-41.

Garg, Nikhil, "Persistent Finite State Machines in Python", Published on: Aug. 22, 2014 Available at: https://engineering.quora.com/Persistent-Finite-State-Machines-in-Python.

Deligiannis, et al., "Uncovering Bugs in Distributed Storage Systems during Testing (not in Production!)", In Proceedings of 14th USENIX Conference on File and Storage Technologies, Feb. 22, 2016, pp. 1-14.

* cited by examiner

FIG. 6

SYSTEMATIC TESTING OF FAILOVER AND RECOVERY FOR DISTRIBUTED SYSTEM COMPONENTS

BACKGROUND

A distributed system allows for components of a system to be hosted on multiple machines. For example, components of a distributed system can be stored separately at different data centers and can pass messages to each other over a network, allowing for the distributed system to act in a coordinated manner. Each machine hosting a distributed system component can be an independent machine having its own memory and processor resources. Furthermore, a distributed system can be asynchronous. In other words, each machine in the asynchronous distributed system need not wait for another machine and can process events in any order received.

In the event of a component failing, one more machines in the distributed system can become unavailable. The distributed system should be able to handle failover and recover from the unavailable machines without losing information or incorrectly processing data. For example each component in the distributed system running on a machine should be able to recover from a failure of the machine and restart functioning in the distributed system (e.g., on another machine) without losing information or incorrectly processing data. Thus, testing on an asynchronous distributed system should cover the ability for the distributed system to handle failover and recover without losing information or incorrectly processing data.

SUMMARY

Embodiments of the present disclosure are directed to performing failover and recovery testing in a distributed system. At a high level, performing failover and recovery testing in a distributed system can use a systematic testing framework, the systematic testing framework including comprehensive testing of states based on probabilistically determining schedules of events (messages) where termination events can occur during execution paths, the termination events causing the distributed system to initiate failover for systematic testing. By determining a schedule of events, e.g., by probabilistically determining a processing order of events, a combination of system states for a plurality of state machines can be tested. In operation, for each iteration of the systematic testing, a system state is effectuated by probabilistically determining a processing order of events being passed between a plurality of state machines. The system state includes the plurality of state machines, where each state machine includes one or more states and has a defined role in the distributed system. For example, a current state for each machine is stored in memory for that machine. In some embodiments, the current state of each machine is also stored in persistent storage. During an iteration of testing, a termination message is sent to at least one of the state machines causing the state machine to halt or simulate failure. In some embodiments, the state of the machine stored in memory is removed from memory when the machine is halted, which simulates a machine failure. A recovery state machine is instantiated for the halted state machine, and is loaded with a same state as the stored state, e.g., from the persistent storage, and assigned a same role as the defined role of the halted state machine. Results of the testing are verified against an expected outcome, where the results are generated by running the distributed system with the instantiated recovery state machine for each iteration of the systematic testing.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present disclosure is described in detail below with reference to the attached drawing figures, wherein.

DETAILED DESCRIPTION

Distributed systems allow for a system to be hosted on multiple machines, e.g., at different data centers by hosted individual components of the system on multiple machines. The components of the distributed system can communicate with each other via messages enabling the different components to coordinate operations and act as a single system. Distributing a system across multiple machines allows for efficiencies where processing for the system can be performed on the multiple machines.

Although operations of a distributed system allow for efficiencies, testing the distributed system can be difficult. For example, in an asynchronous distributed system, a given machine can receive messages in any order. If a message is received out of order, the machine should still be able to process the message and provide an expected output (i.e., output that would have resulted without the failure). If a machines fails while still processing messages, the machine should handle the failure and the system should recover the operations of the machine so that data is not lost and processing can continue. Testing to ensure that the failover and recovery performs as expected in the distributed system can be difficult because of the complexity in determining in what order messages were received and processed by a given machine prior to the halting of the machine. For example, since a machine failure cannot be predicted in advance, knowing at which state a machine halted may be difficult. It is important to test the ability of a distributed system to successfully handle failover and recovery so that the system can operate as expected in the case of an actual failure in the system.

Distributed system components (e.g., computing machines) can handle failover and recovery in several different ways. Typically, distributed system components may recover by loading persisted storage data and initializing the state of the machine in order to resume executing operations. It is common for failures to occur at any point during execution of operations. As such, a conventional method of testing distributed systems, asynchronous distributed systems in particular, for failover and recovery includes hardcoding the failure of a machine into the code of the system (e.g., injection points). However, each failure must be coded and compiled, causing testing to take an excessive amount of time. Furthermore, by hardcoding a failure, the failure is caused at a specific code location, which fails to take into account the randomness of messages being sent and received in the asynchronous distributed system.

Another method known of testing asynchronous distributed systems for failover and recovery is to force a failure extemporaneously, either by physically turning off a machine or passing a command to turn off the machine. However, this can become tedious since each machine needs to be turned off for each iteration of testing and furthermore, does not ensure that all possible system states are tested. Embodiments of the present disclosure are directed to efficient methods and systems for performing systematic testing for failover and recovery in a distributed system.

At a high level, performing failover and recovery testing in a distributed system can use a systematic testing framework, the systematic testing framework including comprehensive testing of states based on probabilistically determining schedules of events where termination events can occur during execution paths, the termination events causing the distributed system to initiate failover for systematic testing. By determining a schedule of events, e.g., by probabilistically determining a processing order of events, a combination of system states for a plurality of state machines can be tested. For example, the systematic testing framework can change (e.g., probabilistically) the order in which events are handled by the various state machines, thus creating different execution schedules. This results in the state machines potentially being in different states for each execution schedule. In other words, systematic testing provides a probabilistic approach to testing, where each iteration of a test potentially tests a different system state of the distributed system. Thus, instead of coding each possible scenario to test, the methodology uses a probabilistic framework to, e.g., test each system state of the distributed system. Systematic testing can leverage the states (e.g., state profiles) of state machines that are received and used when instantiating the state machines in a system state, e.g., passing events through an event scheduler in a probabilistic order until the system state is generated. It is contemplated that even a persistent storage machine that stores persistent data can also be supported by a state machine during failover testing based on the systematic testing framework.

By way of example, the systematic testing framework models failovers (e.g., handling machine failures) as a set of termination events. For example, a systematic testing framework effectuates the state for a plurality of state machines by probabilistically determining a processing order of events being passed between a plurality of state machines. During testing, when the set of termination events is received, a termination message is generated to cause a first set of state machines to shutdown. The persistent storage machine remains running. Upon a determination that the one or more state machines have shutdown, a second set of machines are initialized and a state is loaded to the second set of machines from the persistent storage machine. The systematic testing framework can provide comprehensive testing based on identifying all possible states and schedules of events where termination events can be inserted during execution. Using a systematic testing framework, the multiple system states of the distributed system can be tested. Results of the systematic testing are verified against an expected outcome, the results being generated by running the distributed system with at least one instantiated recovery state machine for each iteration of the systematic testing. Although, some system states may be repeatedly tested, with enough iterations, all system states can be tested. Advantageously, without having to code and compile for each scenario and allowing each iteration to be run from the same process, the testing can be performed quickly allowing for the total testing time to be reduced.

As used herein, the term "state" can refer to a predefined operating mode or set of functionalities of a machine or component. A state can further refer to a particular condition of a component or machine executing operations. For example, a state can be specifically a state of a program, including the contents in memory locations during execution of the program. A component can transition to another state on completing operation. For example, if a state machine has two states, the state machine is in one of the two states or has finished its operation. A "state machine" can refer to a physical or virtual machine that includes multiple states.

As used herein, the term "event" can refer to an external message that is passed between state machines. Upon receipt of an event, a state machine performs an action that can cause the state machine to change its state or perform an action within a state, without entering a different state. The terms "event" and "message" are used interchangeably herein.

As used herein, the term "system state" can refer to a combination of current states of all of the machines in the distributed system. For example, in a two-machine system, a first machine can be at a state 1 and a second machine can be at a state 2. Thus, the system state of the two-machine system includes the first machine at state 1 and the second machine at state 2. It should be understood that a system state not only refers to the combination of current states and can include additional features that describe the distributed system. For example, a system state can also include stored data to support the state of the machines. "Potential system states" can refer to the possible system states that the machines of the distributed system can be in at a given instance.

As used herein, the term "role" can refer to the operations of the distributed system that a particular component is responsible for performing. For example, a role can be rendering a user interface. A given component can be responsible for multiple operations of the distributed system. A role can be performed by any number of components.

As used herein, the term "halt" can refer to a process of ending communication with a machine. For example, by physically turning off a machine, or disconnecting the machine from communication with one to all machines in the distributed system, the communication to the machine is halted. It should be understood that halting can also refer to ending communication via commands from a test machine or blocking the communication channel between a test machine and a halted machine. For example, a test machine can programmatically direct a halted machine to discontinue communication with the test machine and/or other designated machine types. In some embodiments, once a machine is halted, the machine drops all pending events queued to it.

Accordingly, embodiments of the present disclosure, in operation, provide for each iteration of the systematic testing a system state that is effectuated and tested. The system state includes a plurality of state machines, where each state machine includes one or more states and has a defined role in the distributed system. During an iteration of testing, a termination message is sent to at least one of the state machines causing the state machine(s) to halt or simulate failure. A recovery state machine is instantiated for the halted state machine, the recovery state machine being instantiated with a same state as the state and with a same role as the defined role of the halted state machine. Results of the testing are verified against an expected outcome, where the results are generated by running the distributed system with the instantiated recovery state machine for each iteration of the systematic testing.

Figure 1:
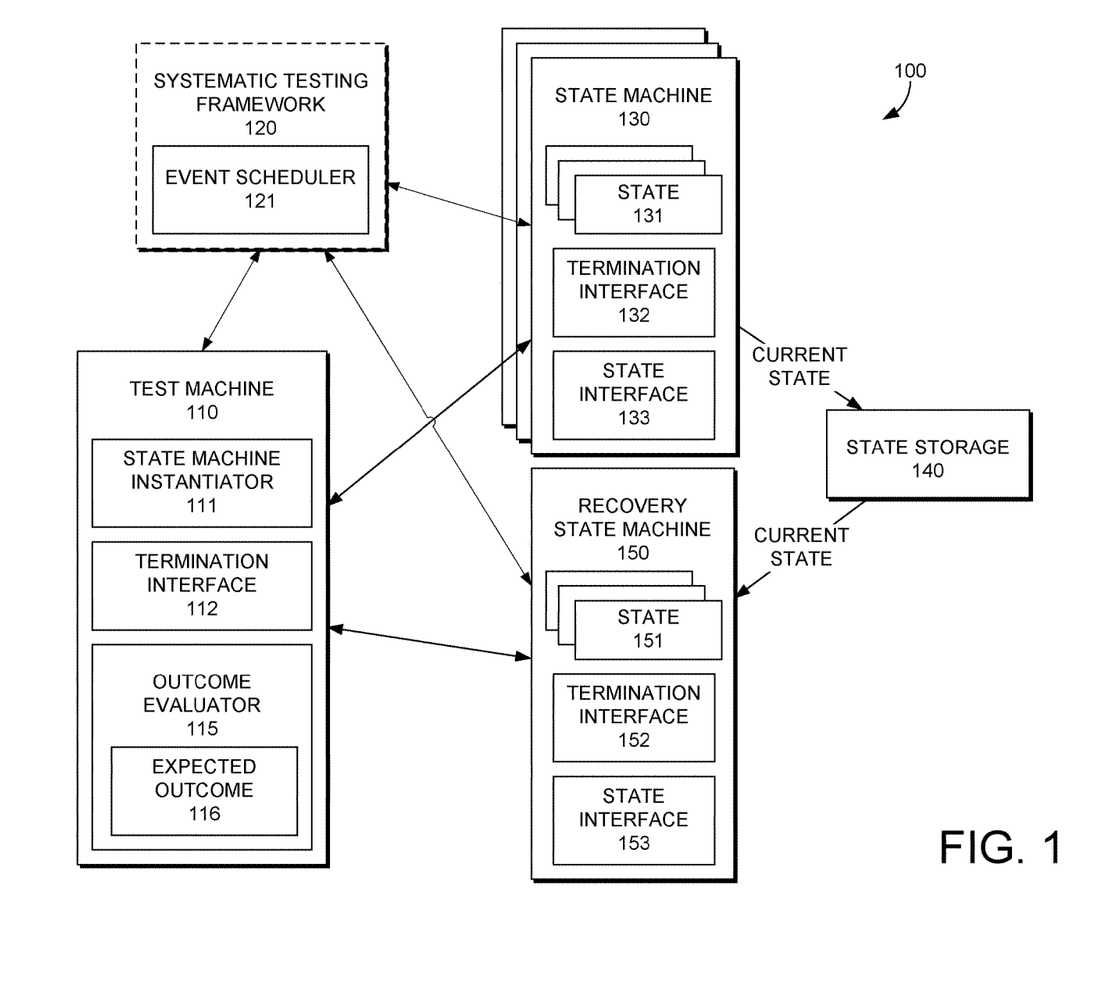
FIG. 1 is a schematic diagram showing a failover and recovery testing system, in accordance with embodiments of the present disclosure.

With reference to FIG. 1, embodiments of the present disclosure can be discussed with reference to a failover and recovery testing system 100 for implementing functionality described herein. Components of the failover and recovery testing system 100 may be hosted on a single machine or on multiple machines. Furthermore, the machines may be hosted at a single data center or multiple data centers. The failover and recovery testing system 100 includes a test machine 110, a systematic testing framework 120, a plurality of state machines 130, a state storage 140 and a recovery machine 150.

Turning to the components of FIG. 1, test machine 110 can comprise a state machine instantiator 111, a termination interface 112, and an outcome evaluator 115. The state machine instantiator 111 instantiates state machines, e.g., the plurality of state machines 130, in the distributed system. The termination interface 112 sends a termination message to one or more of the state machines 130 and receives an acknowledgement from the terminated machine that the state machine has terminated. The outcome evaluator 115 evaluates the outcome from testing performed on the plurality of state machines 130 and the recovery machine 150, comparing the results to an expected outcome 116.

The systematic testing framework 120 provides the testing framework for the distributed system. The systematic testing framework 120 effectuates the states for the plurality of state machines 130 by, for example, probabilistically determining a processing order of events being passed between the plurality of state machines 130. For example, the event scheduler 121 can arrange an order of events being passed between state machines in a probabilistic manner to achieve a system state. The event scheduler 121 determines the order of events to pass to the plurality of state machines 120. For example, the event scheduler 121 receives the messages being sent from the plurality of state machines 130. Instead of directly passing the messages being sent from the plurality of state machines 130, it can changed the order in which messages are passed to the plurality of state machines 130. This allows the distributed system to account for an asynchronous distributed system where messages may be passed in any order. The order in which the messages are passed can be determined probabilistically to achieve all of the potential combinations of system states. It should be understood that the systematic testing framework 120 is shown as a separate component of the failover and recovery testing system 100 for illustrative purposes only, and can instead be part of any of the machines or components of the failover and recovery testing system 100 or can be part of a separate machine, e.g., the computing device 500 of FIG. 5.

The distributed system can be asynchronous and communication between the components of the distributed system can occur through the passing of messages. In some embodiments, the test machine receives and passes messages that are sent and received from any of the components in the systematic testing system 100. For example, if one state machine in the distributed system passes a message to another state machine, the message can pass through the systematic testing framework 120. This allows the systematic testing framework 120 to monitor the plurality of state machines 130. In some embodiment, messages are not passed through the systematic testing framework 120 and are instead passed directly between components. In those embodiments, the systematic testing framework 120 can monitor activity by, e.g., receiving messages or acknowledgments from the components identifying that an action has occurred or an event has been received.

A state machine 130 has one or more states 131. The state machine 130 can exit one state and enter another state. The state machine knows which state it is currently in, and can process messages that allow it to remain in the same state or enter a different state. A state machine 130 has a termination interface 132 that receives a termination message from the test machine 110 and sends a termination acknowledgement message to the test machine 110. In some embodiments, the termination interface 132 send a termination message to one or more child machines, and waits for a termination acknowledgement message from the one or more child machines before the state machine 130 terminates. A state machine 130 also has a state interface 133 that communicates a current state of the state machine 130 with the state storage 140. The state interface 133 can also receive a current state from the state storage 140 and place the state machine 130 in the current state (e.g., for recovery).

The state storage 140 receives the current state of each of the state machines 130 and stores the current state. In some embodiments, the state storage 140 persists the current state of the state machines 130. In some embodiments, the state storage 140 is a state machine.

A recovery state machine 150 is instantiated by the test machine 110 after one of the state machines 130 halts. For example, the test machine 110 sends a termination message to one of the state machines causing the state machine to halt. After the state machine has halted and the recovery state machine 150 has been instantiated, the recovery state machine 150 receives the current state of the halted state machine from the table storage 140 and recovers the recovery state machine 150 to the current state. The recovery machine 150 may have the same structure as the halted state machine 130, i.e., the recovery state machine 150 has one or more states 151, a termination interface 152, and a state interface 153. The one or more states 151 correspond to the one or more states 131 of the halted machine, which can be defined by its role or roles. The termination interface 152 can receive a termination message from the test machine 110 and send a termination acknowledgement message back to the test machine 110.

The state interface 153 can receive a current state from the state storage 130 and place the recovery state machine 150 in the current state. The state interface 153 can also send a current state of the recovery state machine 150 to the state storage 140. Thus, the recovery state machine 150 can take on the role of the halted state machine 130 allowing the distributed system to continue operation. In some cases, certain features of the halted state machine need not be included in the recovery state machine, such as the termination interface.

Figure 2:
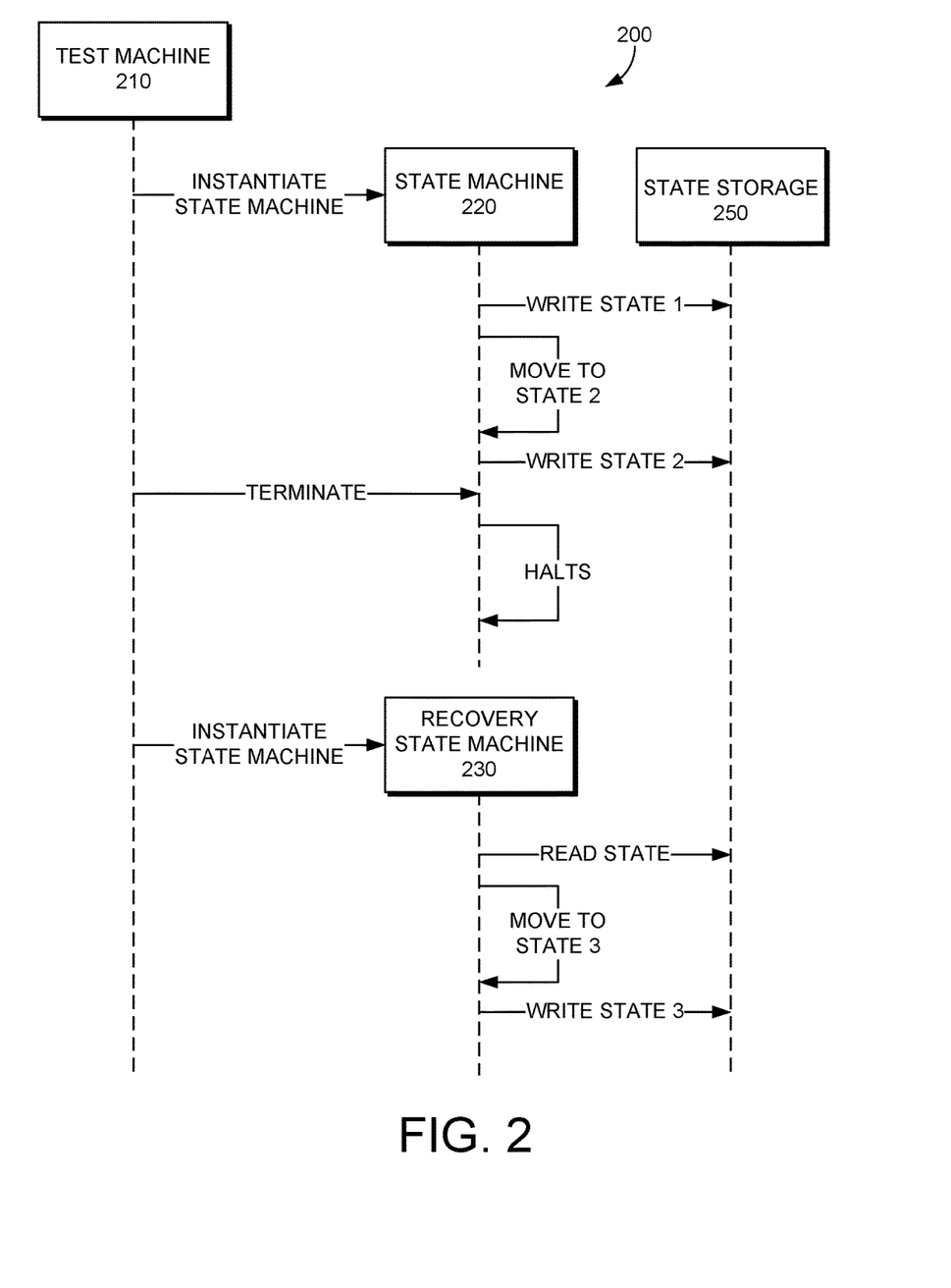
FIG. 2 is an example of a test machine terminating a state machine and instantiating a recovery state machine, in accordance with embodiments of the present disclosure.

Turning to FIG. 2, FIG. 2 illustrates an example of a test machine terminating a state machine and instantiating a recovery state machine. Test machine 210, which can correspond to test machine 110 of FIG. 1, performs the systematic testing on the distributed system. For example, a test harness can be created to run the systematic testing on the distributed system. The test harness can include instructions to instantiate different machines in the distributed system and will include instruction to run the machines to achieve a system state. For each iteration of the systematic testing, a system state can be entered due to the probabilistic nature of the systematic testing. For example, in a given iteration of testing, test machine 210 initially instantiates state machine 220, which can correspond to any of the plurality of state machines 130 of FIG. 1. As state machine 220 continues operation, it sends its current state to state storage 250, which can correspond to state storage 140 of FIG. 1. For example, when state machine 220 enters into state 1, it writes state 1 to the state storage 250. As state machine 220 moves to state 2, it writes state 2 to state storage 250. Thus, state storage 250 stores the current state of state machine 220.

Test machine 210 then sends a termination message to state machine 220. This causes state machine 220 to halt. Once state machine 220 is halted, test machine 210 may no longer communicate with state machine 220. In some embodiments, when state machine 220 receives a termination message from test machine 210, it sends a termination acknowledgement message back to test machine 210, and subsequently halt. Thus, test machine 210 can determine that state machine 220 is halted.

After state machine 220 is halted, test machine 210 instantiates recovery state machine 230, which can correspond to recovery state machine 150 of FIG. 1. Recovery state machine 230 can be instantiated based on the test machine 210 receiving the termination acknowledgement message from state machine 220. Recovery state machine 230 reads the current state of the halted state machine 220 from state storage 250 and recovers recovery state machine 230 to the current state. For example, if the halted state machine 220 was at state 2 when it halted, state 2 will be read from state storage 250 and recovery state machine 230 will be initialized to state 2. In some embodiments, recovery state machine is instead provided with the current state of the state machine 220. In some embodiments, recovery state machine 230 is instantiated to the current state of the state machine 220. It should be understood that the previous descriptions are only example of how the recovery state machine can be set to a given state and other means of recovering a state can be contemplated. After recovery state machine 230 takes the role of state machine 220, recovery state machine 230 may proceed to state 3. After moving to state 3, it continues operation until the end of the testing iteration.

Figure 3:
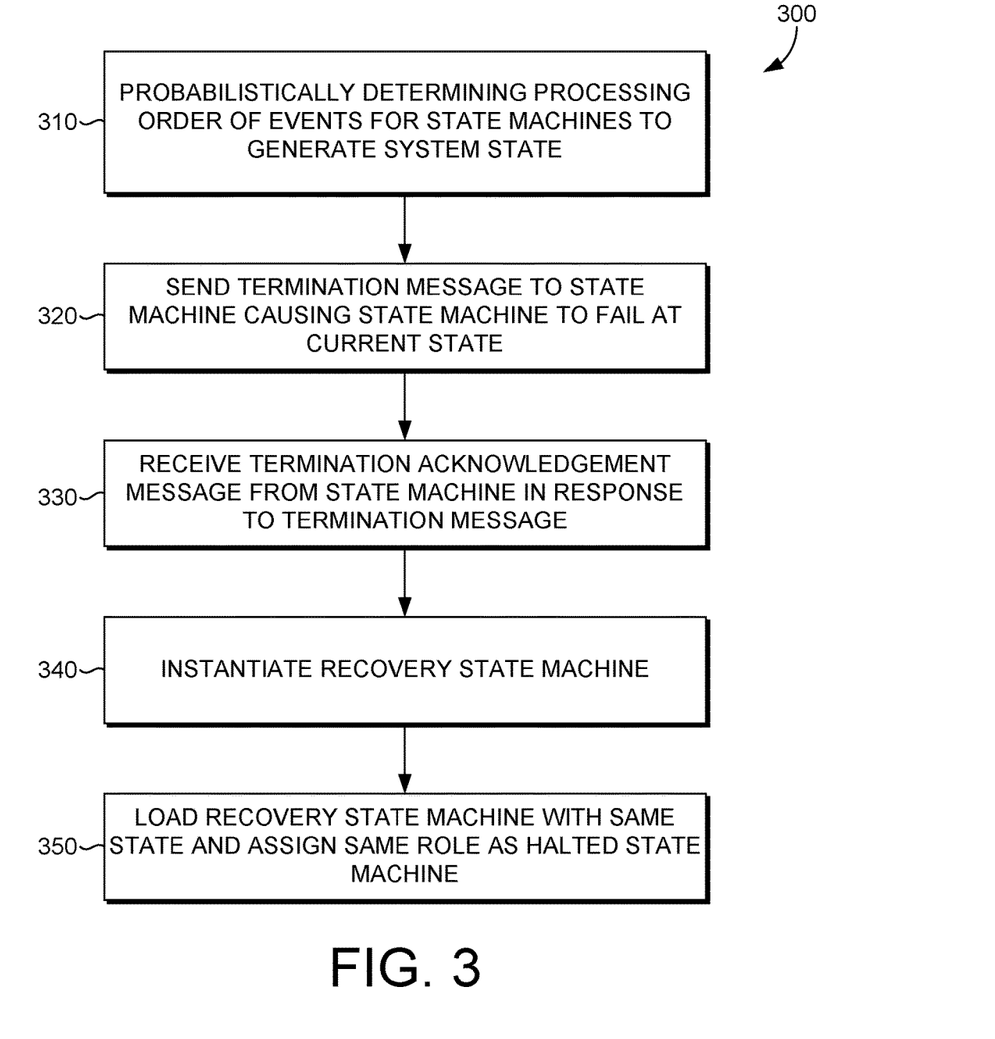
FIG. 3 is a flow diagram showing a method for implementing failover and recovery testing, in accordance with embodiments of the present disclosure.
Figure 4:
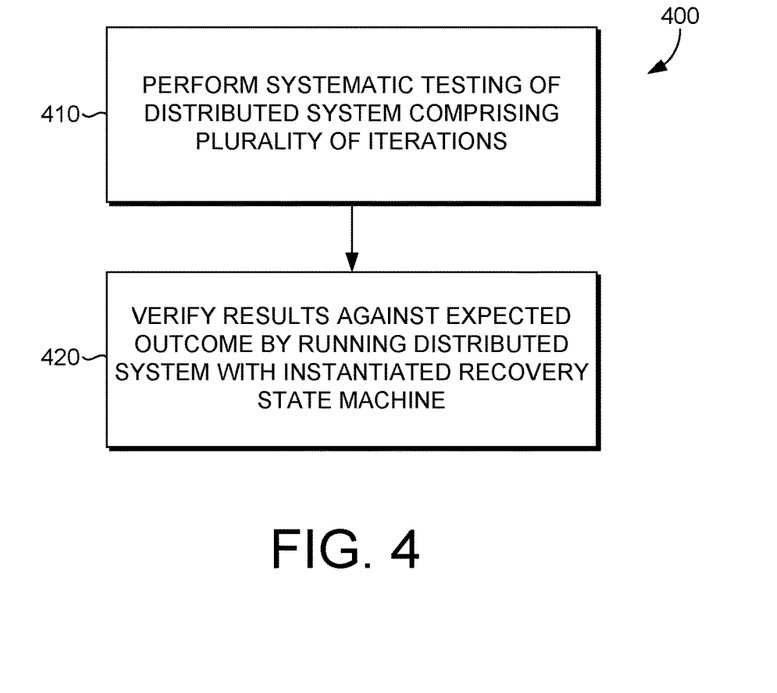
FIG. 4 is a flow diagram showing a method for implementing failover and recovery testing, in accordance with embodiments of the present disclosure.

With reference to FIGS. 3 and 4, a method for implementing failover and recovery testing is provided. FIG. 3 illustrates an iteration of a systematic test for failover and recovery.

At block 310, a system state is effectuated for the plurality of state machines in the distributed system by probabilistically determining a processing order of events for the plurality of state machines. Each state machine comprises one or more states. A state machine can only be in a single state at a given time, but generally, can enter and exit each of the states. A number of potential system states can be the number of possible combinations of states that all of the state machines can be in a given time. For example, in a two-state machine system, if each state machine has two states, the number of potential system states is 4 (see TABLE 1 below).

TABLE 1

| STATE MACHINE 1 (M1) | STATE MACHINE 2 (M2) | SYSTEM STATES |
| --- | --- | --- |
| State 1 (S1) | State 1 (S1) | M1: S1, M2: S1 |
| State 1 (S1) | State 2 (S2) | M1: S1, M2: S2 |
| State 2 (S2) | State 1 (S1) | M1: S2, M2: S1 |
| State 2 (S2) | State 2 (S2) | M1: S2, M2: S2 |

The systematic testing framework 120 of FIG. 1 can probabilistically determine a processing order of events for the plurality of state machines, which can correspond to the plurality of state machine 220 of FIG. 1. Each state machine receives and processes events from the systematic framework allowing the state machine to achieve a specific state. The state machines also have a defined role in the distributed system. For example, a state machine can have a role of calculating a value for the distributed system.

At block 320, a termination message is sent to a state machine of the plurality of state machines. The termination message causes the state machine to halt at a current state of the one or more states. For example, if a state machine is running in a first state and the state machine halts, the current state will be the first state. A state machine can halt, e.g., if the machine is shut down or communication to the machine is terminated. In some embodiments, a state machine can instantiate one or more child machines. When the state machine receives the termination message, it can propagate the termination message to each child machine and optionally receive a termination acknowledgement message from the child machine. After receiving the termination acknowledgement message from the child machines (e.g., from each child machine or from each directly dependent child machine), the state machine can be halted. It should be understood that a termination message is sent to one state machine for illustrative purposes only, and that a termination message can instead be sent to multiple machines. Each machine can propagate the termination message to each of its child machines and can be halted or a separate message could be sent from the test machine to each state machine.

At block 330, a termination acknowledgment message is received from at least the state machine in response to the termination message. In some embodiments, a termination acknowledgement message is not received from the state machine and the test machine can otherwise determine that the state machine has terminated. In some embodiments, the halted state machine drops all of the remaining messages, i.e., pending events, that were sent to the halted state machine.

At block 340, a recovery state machine is instantiated for the halted state machine. The recovery state machine is recovered with a same state as the current state of the halted state machine and with a same role as the defined role of the halted state machine. For example, the recovery state machine can retrieve the current state, i.e., the state of the halted state machine upon halting, from persistent storage and be loaded to the same state as the current state. This allows the recovery state machine to be in the same state as the current state. Furthermore, the recovery state machine takes the same role as the halted state machine. Thus, the distributed system can treat the recovery state machine the same as the halted state machine.

FIG. 4 illustrates the method for implementing failover and recovery testing. At block 410, systematic testing of failover and recovery of the distributed system is performed. For example, the systematic testing can perform one or more interations of the testing as described in FIG. 3. As described above, systematic testing provides a way of testing a probabilistically determined combination of states for a plurality of state machines by probabilistically determining a processing order of events being passed between the plurality of state machines so that the state machines can potentially be in a different systems state for each iteration of testing. As the number of iterations increase, the likelihood of testing all possible system states increases. This allows for thorough testing of the distributed system without inserting failures into code of the modules run on the machines or performing stress testing. In order to test all possible system states, the number of iterations of testing should be at least as great as the number of system states. For each iteration of testing, a system state will likely be in a different system state than the previous system state. In some embodiments, the state machines are not initially set to a predetermined system state, and the systematic testing framework performs operations to place the state machines in the desired system state for testing.

At 420, the results of the systematic testing are verified against an expected outcome. The results are generated by running the distributed system with the instantiated recovery state machine for each iteration of the systematic testing. In some embodiments, assertions to test are verified against the results of the systematic testing. For example, if a component must exit a state, but never does so, that assertion can be verified against the outcome, e.g., whether the component exited the state. As another example, if the system is supposed to add two numbers, the system should be verified that it produced the correct result. It should be understood that the verification of the systematic testing need not be performed after all of the iterations of the systematic testing are performed and the verification can occur after each iteration of the systematic testing. For example, a result of an iteration can be verified against an expected outcome of the iteration. In some embodiments, the results are displayed to a user, where the results indicate which system states failed or passed. It should be understood that other ways of verifying results of the systematic testing can be contemplated. For example, an alert can be presented when an iteration of the testing fails, e.g., the outcome does not match an expected outcome.

Testing failover and recovery using systematic testing has some advantages over conventional methods. For example, in one conventional method, the failure can be coded into the components of the state machines. However, testing using this manner is tedious, since each iteration of testing requires the test to be run over again and the code to be changed and recompiled. Another convention method is to stress test the distributed system. However, this can take a long period of time and there is no guarantee that every system state will be approached.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 5:
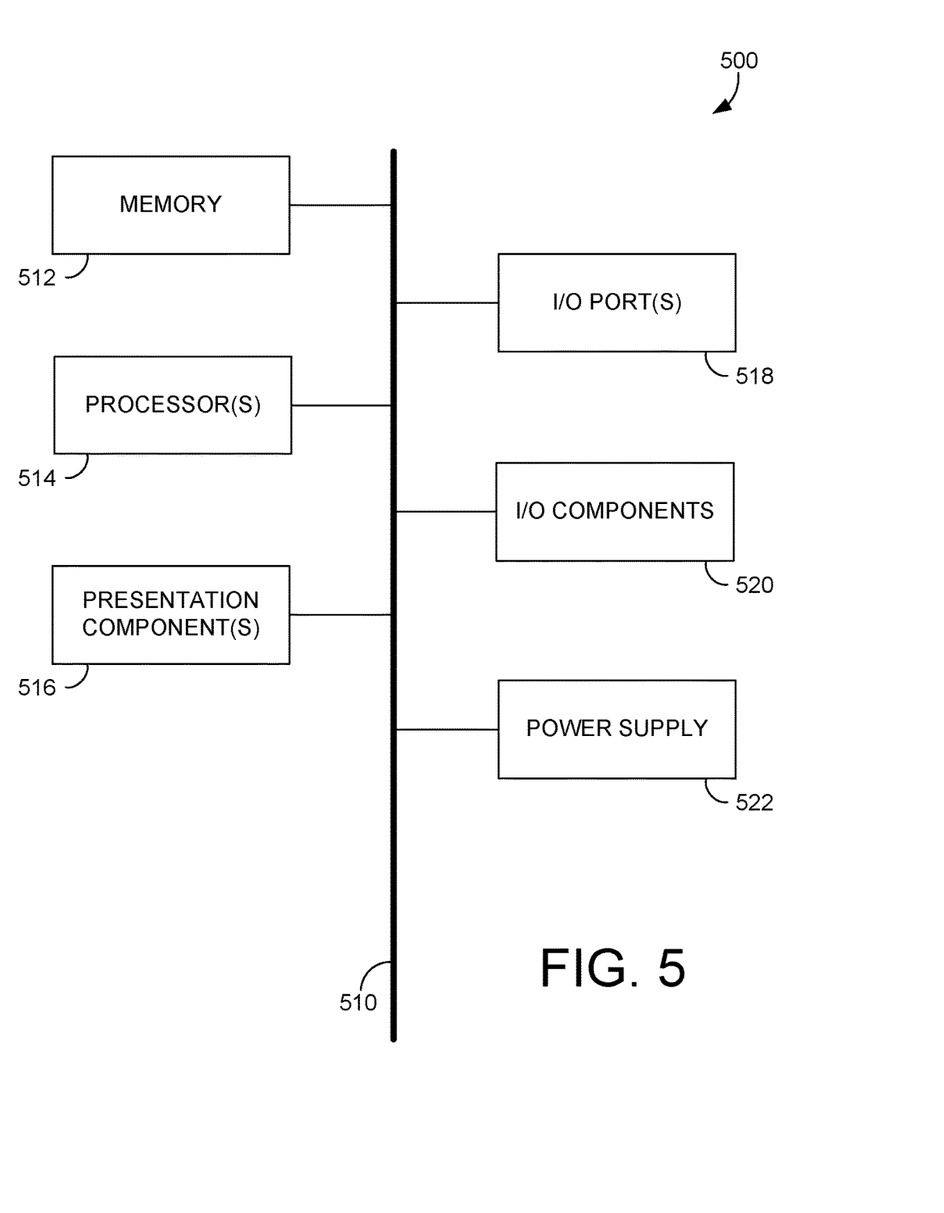
FIG. 5 is a block diagram of an exemplary computing device suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring initially to FIG. 5 in particular, an exemplary operating environment for implementing embodiments of the present disclosure is shown and designated generally as computing device 500. Computing device 500 is but one example of a suitable computing environment and is not intended to suggest any limitation as to the scope of use or functionality of the disclosure. Neither should the computing device 500 be interpreted as having any dependency or requirement relating to any one or combination of components illustrated. Any of the test machine 110, plurality of state machines 120, state storage 130, and recovery machine 150 of FIG. 1 can include computing device 500.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Figure 6:
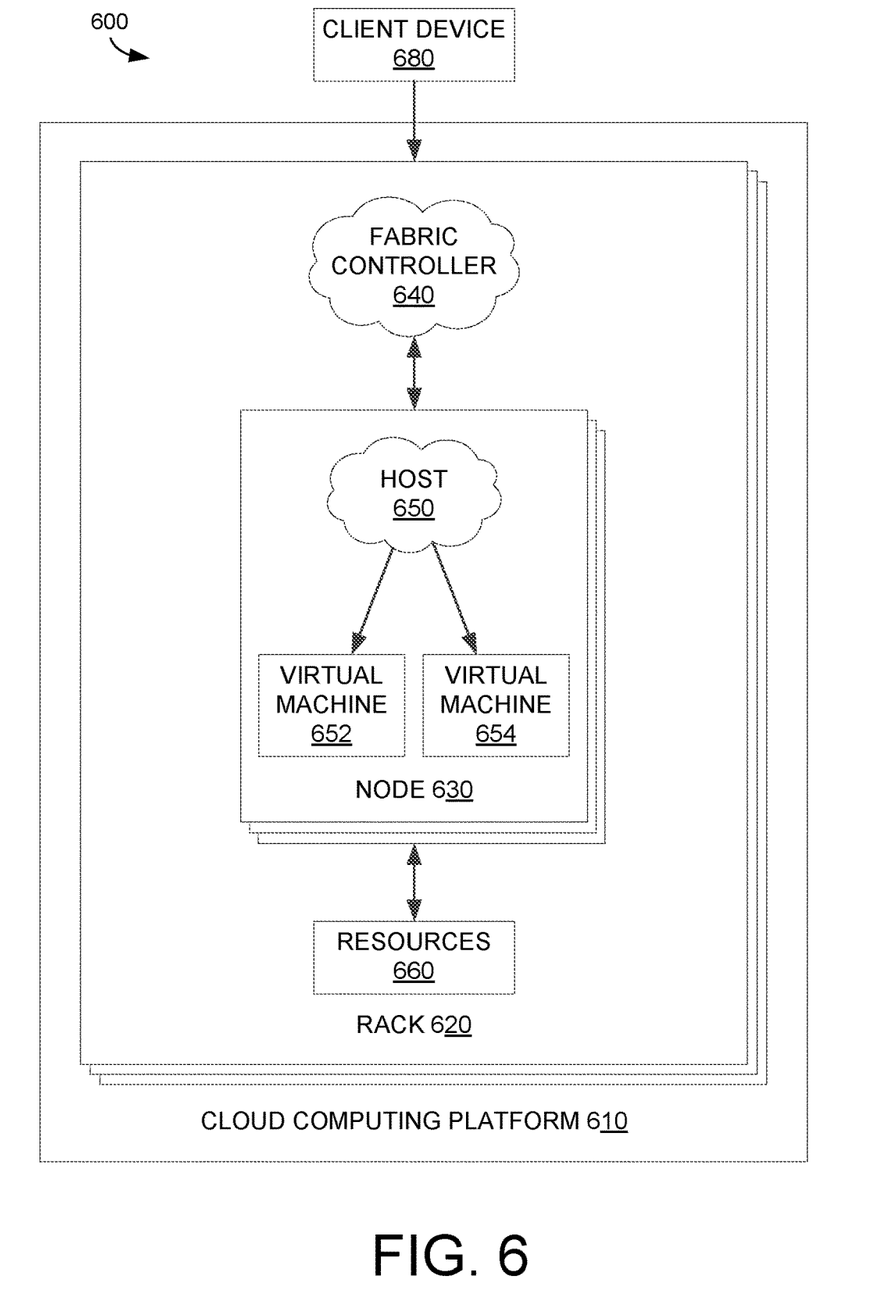
FIG. 6 is a block diagram of an exemplary computing environment suitable for use in implementing embodiments of the present disclosure.

Referring now to FIG. 6, FIG. 6 illustrates an exemplary distributed computing environment 600 in which implementations of the present disclosure may be employed. In particular, FIG. 6 shows a high level architecture of the autonomous configuration system ("system") in a cloud computing platform 610, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 600 that includes the cloud computing platform 610, rack 620, and node 630 (e.g., computing devices, processing units, or blades) in rack 620. The system can be implemented with a cloud computing platform 610 that runs cloud services across different data centers and geographic regions. The cloud computing platform 610 can implement a fabric controller 640 component for provisioning and managing resource allocation, deployment, upgrade, and management of cloud services. Typically, the cloud computing platform 610 acts to store data or run service applications in a distributed manner. The cloud computing infrastructure 610 in a data center can be configured to host and support operation of endpoints of a particular service application. The cloud computing infrastructure 610 may be a public cloud, a private cloud, or a dedicated cloud.

The node 630 can be provisioned with a host 650 (e.g., operating system or runtime environment) running a defined software stack on the node 630. Node 630 can also be configured to perform specialized functionality (e.g., compute nodes or storage nodes) within the cloud computing platform 610. The node 630 is allocated to run one or more portions of a service application of a tenant. A tenant can refer to a customer utilizing resources of the cloud computing platform 610. Service application components of the cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 630, the nodes may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in the cloud computing platform 610. It is contemplated that resources can be configured for specific service applications. Further, each service application may be divided into functional portions such that each functional portion is able to run on a separate virtual machine. In the cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in the cloud computing platform 610. The client device 680 may be any type of computing device, which may correspond to computing device 600 described with reference to FIG. 6, for example. The client device 680 can be configured to issue commands to cloud computing platform 610. In embodiments, client device 680 may communicate with service applications through a virtual Internet Protocol (IP) and load balancer or other means that directs communication requests to designated endpoints in the cloud computing platform 610. The components of cloud computing platform 610 may communicate with each other over a network (not shown), which may include, without limitation, one or more local area networks (LANs) and/or wide area networks (WANs).

Having described various aspects of the distributed computing environment 600 and cloud computing platform 610, it is noted that any number of components may be employed to achieve the desired functionality within the scope of the present disclosure. Although the various components of FIG. 6 are shown with lines for the sake of clarity, in reality, delineating various components is not so clear, and metaphorically, the lines may more accurately be grey or fuzzy. Further, although some components of FIG. 6 are depicted as single components, the depictions are exemplary in nature and in number and are not to be construed as limiting for all implementations of the present disclosure.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a head-mounted display device as an augmented reality device; however the head-mounted display device depicted herein is merely exemplary. Components can be configured for performing novel aspects of embodiments, where configured for comprises programmed to perform particular tasks or implement particular abstract data types using code. Further, while embodiments of the present disclosure may generally refer to the head-mounted display device and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

We claim:

1. A method for testing failover and recovery, comprising:
performing systematic testing of a distributed system, the systematic testing generating system states comprising a probabilistically determined combination of states for a plurality of state machines, the systematic testing comprising a plurality of iterations, each iteration testing one of the system states, each iteration comprising:
probabilistically determining a processing order of events for the plurality of state machines in the distributed system to generate the one of the system states;
sending a termination message to a state machine of the plurality of state machines, the state machine having a defined role in the distributed system, the termination message causing the state machine to halt at the state of the state machine for the one of the system states;
receiving a termination acknowledgment message from the state machine in response to the termination message;
instantiating a recovery state machine for the halted state machine;
loading the recovery state machine with a same state as the state of the halted state machine and assigning the recovery state machine with a same role as the defined role of the halted state machine; and
verifying results of the systematic testing against an expected outcome, the results being generated by running the distributed system with the instantiated recovery state machine for each iteration of the systematic testing.

2. The method of claim 1, wherein the distributed system is asynchronous.

3. The method of claim 1, wherein the state machine sends a second termination message to a child machine and waits for a second acknowledgement message from the child machine prior to halting in response to the termination message.

4. The method of claim 1, wherein a first iteration of the plurality of iterations effectuates a different system state from a second iteration of the plurality of iterations.

5. The method of claim 1, wherein a number of the plurality of iterations performed of the systematic testing is at least a number of potential system states of the distributed system.

6. The method of claim 1, wherein verifying results of the systematic testing comprises displaying results of the testing to a user, the results indicating which system states failed or passed.

7. The method of claim 1, wherein the state of the halted state machine is persisted in state storage; and the loading the recovery state machine with a same state as the state of the halted state machine comprises retrieving a state of the halted state machine from the state storage and loading the recovery state machine with the state of the halted state machine.

8. The method of claim 7, wherein the state storage is a state machine.

9. The method of claim 7, wherein each of the plurality of state machines stores a corresponding state to the state storage.

10. A system for testing failover and recovery comprising:
one or more state machines, each state machine comprising one or more states, each state machine having a defined role in a distributed system, and each state machine storing a current state of the one or more states in a central storage;
the central storage to store the current state of the one or more states for each of the one or more state machines; and
a test machine to:
instantiate the one or more state machines;
send a termination message to a state machine of the one or more state machines, the termination message causing the state machine to halt the state and the event of the state machine for the one of the system states;
receive a termination acknowledgment message from the state machine in response to the termination message;
instantiate a recovery state machine for the halted state machine;

load the recovery state machine with a same state as the state of the halted state machine and assigning the recovery state machine with a same role as the defined role of the halted state machine and verify results of the systematic testing against an expected outcome, the results being generated by running the distributed system with the instantiated recovery state machine for each iteration of the systematic testing; and a systematic testing framework to perform systematic testing of the distributed system comprising a plurality of iterations, each iteration comprising probabilistically determining a processing order of events for the plurality of state machines in the distributed system to effectuate a system state for the one or more state machines, a system state comprising a combination of states for the one or more state machines, the processing order of events including the termination message.

11. The system of claim 10, wherein the distributed system is asynchronous.

12. The system of claim 10, wherein the state machine instantiates a child machine; and wherein the state machine sends a second termination message to the child machine and waits for a second acknowledgement message from the child machine prior to halting.

13. The system of claim 10, wherein a first iteration of the plurality of iterations generates a different system state from a second iteration of the plurality of iterations.

14. The system of claim 10, wherein the loading the recovery state machine with a same state as the state of the halted state machine comprises retrieving a state of the halted state machine from the central storage and loading the recovery state machine with the state of the halted state machine.

15. The method of claim 14, wherein each of the plurality of state machines
stores a corresponding state to the central storage.

16. A computer storage device comprising computer-executable instructions embodied thereon that, when executed by a computing device, test failover and recovery, the instructions causing the computing device to:

perform systematic testing of a distributed system, the systematic testing probabilistically effectuating system states comprising a combination of states for a plurality of state machines, the systematic testing comprising a plurality of iterations, each iteration testing one the system states, each iteration comprising:

sending a termination message to a state machine of the plurality of state machines, the state machine having a defined role in the distributed system, the termination message causing the state machine to halt at the state of the state machine in the one of the system states;

receiving a termination acknowledgment message from the state machine in response to the termination message;

instantiating a recovery state machine for the halted state machine;

and loading the recovery state machine with a same state as the state of the halted state machine and assigning the recovery state machine with a same role as the defined role of the halted state machine; and verify results of the systematic testing against an expected outcome, the results being generated by running the distributed system with the instantiated recovery state machine for each iteration of the systematic testing.

17. The computer storage device of claim 16, wherein the performing systematic testing further comprises:
instantiating the plurality of state machines; and
passing events between the plurality of state machines in a probabilistic order until the one of the system states is effectuated.

18. The computer storage device of claim 16, wherein the state machine instantiates a child machine; and wherein the state machine sends a second termination message to the child machine and waits for a second acknowledgement message from the child machine prior to halting.

19. The computer storage device of claim 16, wherein a first iteration of the plurality of iterations generates a different system state from a second iteration of the plurality of iterations.

20. The computer storage device of claim 16, wherein the state of the halted state machine is persisted in central storage; and the loading the recovery state machine with a same state as the state of the halted state machine comprises retrieving a state of the halted state machine from the central storage and loading the recovery state machine with the state of the halted state machine.

* * * * *